T862014

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1009

641,140

PHENOLSULFONATES AS A FILLER IN ANIONIC DETERGENT BARS

Robert O. Miller and Leonard A. Mattano, Midland, Mich., assignors to The Dow Chemical Company, Midland, Mich., a corporation of Delaware

Filed May 25, 1967. Published May 27, 1969

Int. Cl. C11d *9/32, 1/16, 3/34*

U.S. Cl. 252—121

No Drawing. 9 Pages Specification

Water-soluble phenolsulfonates are effective fillers for toilet bars containing natural and synthetic anionic detergents. As a filler they have improved compatability with the anionic detergent and other ingredients of a commercial bar without diminishing the characteristic lather and feel. The phenolsulfonates in the form of their alkali metal or ammonium salts may be used as fillers for toilet bars containing such anionic detergents as: fatty acid soaps, $C_8$–$C_{22}$ alkyl sulfates, $C_8$–$C_{16}$ alkylbenzene sulfonates, sulfonates of alkylphenol-ethylene oxide condensates, fatty acid esters of N-methyl taurine, acyl isethionates and alkyl glyceral ether sulfonates.